US006735393B1

(12) United States Patent
Zouganeli

(10) Patent No.: US 6,735,393 B1
(45) Date of Patent: May 11, 2004

(54) ALL-OPTICAL NETWORK WITH PASSIVE WAVELENGTH ROUTERS

(75) Inventor: Paraskevi Zouganeli, Oslo (NO)

(73) Assignee: Telenor, AS, Oslo (NO)

( * ) Notice: Subject to any disclaimer, the term of this patent is extended or adjusted under 35 U.S.C. 154(b) by 713 days.

(21) Appl. No.: 09/667,544

(22) Filed: Sep. 22, 2000

Related U.S. Application Data
(60) Provisional application No. 60/220,480, filed on Jul. 25, 2000.

(30) Foreign Application Priority Data

Sep. 24, 1999 (NO) .......................................... 1999 4691

(51) Int. Cl.[7] .......................... H04J 14/00; H04B 10/20
(52) U.S. Cl. .............................. 398/48; 398/57; 398/63
(58) Field of Search ............................ 398/45, 48, 49, 398/50, 51, 57, 63, 83, 84, 85; 370/16

(56) References Cited

U.S. PATENT DOCUMENTS

| | | | | |
|---|---|---|---|---|
| 5,253,248 A | * | 10/1993 | Dravida et al. ............. | 370/228 |
| 5,748,350 A | | 5/1998 | Pan et al. .................... | 359/130 |
| 5,774,244 A | * | 6/1998 | Tandon et al. ................ | 398/67 |
| 5,930,018 A | * | 7/1999 | Effenberger ................ | 398/161 |
| 6,226,111 B1 | * | 5/2001 | Chang et al. .................. | 398/9 |
| 6,529,300 B1 | * | 3/2003 | Milton et al. ................. | 398/59 |

FOREIGN PATENT DOCUMENTS

| | | |
|---|---|---|
| FR | 2746239 A1 | 9/1997 |
| WO | WO 98/09407 | 3/1998 |

OTHER PUBLICATIONS

Michael S. Borella, et al, "Optical Components for WDM Lightwave Networks", Proceedings of the IEEE, vol. 85, No. 8, pp. 1274–1307, Aug. 1997.

N.P. Caponio, et al, "Switchless Optical Network for Advanced Transport Architecture", Lasers and Electro–Optics Society Annual Meeting, 1998, vol. 1: Dec. 1–4, 1998, pp 358–359.
Roudas, I., et al, "Wavelength–Domain Simulation of Multiwavelength Optical Networks", IEEE Journal of Selected Topics in Quantum Electronics, vol. 6, No. 2, Mar./Apr. 2000, pp. 348–362.
Evi Zouganeli, "Optical Network Evolution: Forces: Features & Futures. The Use of Programmable Laser Transmitters." Presented at the IIR Conference, "Telecoms Transmission Networking", Barcelona, Spain, Dec. 1999, (10 Pages).
Evi Zouganeli, et al, "DWDM in the Metropolitan and the Core Network". Presented at the Alliance Engineering Symposium 2000 Paris, France, Jun. 2000, pp. 1–8.
Pauline Rigby, "Network Trials Tune in to Wavelength Routing", Fibre Systems, Jul. 2000 (pp. 35, 37, 38 and 40).
Evi Zouganeli, "Re–Configurable Optical Mesh Network Using Programmable Laser Transmitters". Presented at Opticon 2000, San Francisco, California, Jul. 31–Aug. 3, 2000 (12 Pages).

(List continued on next page.)

Primary Examiner—Leslie Pascal
Assistant Examiner—Dzung Tran
(74) Attorney, Agent, or Firm—Oblon, Spivak, McClelland, Maier & Neustadt, P.C.

(57) ABSTRACT

An optical network, which may be an all-optical network, including passive wavelength routers is described. Methods for implementing such networks as well as different router configurations which may be used in optical networks are also disclosed. The routing functionality in the all-optical network can be done in the optical domain without switching elements at the nodes. This is achieved by routers which are passive and preferably operative to route wavelength bands. A mesh can be used as the network configuration. The optical networks described can be used to facilitate the transmission of higher network protocols, such as internet protocol (IP) packets or ATM-cells, purely in the optical domain.

70 Claims, 8 Drawing Sheets

OTHER PUBLICATIONS

Evi Zouganeli, et al, "*Wavelength Routed Network Using Widely Tunable Laser Transmitters*". Presented at the European Conference on Optical Communications 2000, Munich, Germany, Sep. 3–7, 2000, pp. 51–52.

Evi Zouganeli, et al, "*Report of Evaluation of the Potential of Widely Tunable Lasers for Application in WDM Systems and Networks*". Delivered to the CEC on Sep. 1998. The date made available to the public is unknown at this time.

Evi Zouganeli, et al, "*Application and Control of Widely Tunable Lasers in HD WDM Systems*", pp. 1–42, Delivered to the CEC on Apr. 2000. The date made available to the public is unknown at this time. (22 Pages).

Yung–Kuang Chen, et al, "*Fiber Bragg Grating–Based Large Nonblocking Multiwavelength Cross–Connects*", Journal of Lightwave Technology, vol. 16, No. 10, pp. 1746–1756, Oct. 10, 1998.

Michael S. Borella, et al, "*Optical Components for WDM Lightwave Networks*", Proceedings of the IEEE, vol. 85, No. 8, pp. 1274–1307, Aug. 1997.

"Advances in Transport Network Technologies: Photonic Networks, ATM, and SDH", Photonic Transport Network, pp. 129–175, 1994 IEEE.

\* cited by examiner

Optical Cross Connect
 Node implementing passive routing

ALL-OPTICAL NETWORK WITH PASSIVE WAVELENGTH ROUTERS

CROSS-REFERENCE TO RELATED APPLICATIONS

The present application claims priority to Norwegian patent application 1999 4691, filed Sep. 24, 1999; and to the U.S. provisional application Ser. No. 60/220,480, filed Jul. 25, 2000; the entire contents of both of these applications being hereby incorporated by reference.

BACKGROUND OF THE INVENTION

1. Field of the Invention

The present invention relates to optical networks, signal routing network elements for such networks and methods for implementing optical networks. Especially the invention concerns an all-optical network, passive wavelength routers for such networks, and methods for implementing all-optical networks. Uses of the invention are also disclosed.

2. Discussion of the Background

An optical network consists basically of nodes with optical transmitters and receivers, optical fibre as the transmission line connecting these nodes, and signal routing/switching network elements (NE) at the nodes. An all-optical network is a network where the signal remains in the optical domain all the way from the transmitting to the receiving end, i.e. where no conversion from the optical to the electrical domain (or vice versa) takes place at the intermediate nodes. In today's backbone network the transmission between nodes is done optically, yet the network itself is actually not all-optical in that all the processing and routing functionality at the node is done in the electrical domain. The signal is converted to the electrical domain at each node and the header information that is incorporated in the digital signal serves to direct it forward to the next node in order to reach its final destination. In this respect all the routing, i.e. the path-finding, through the network is done at levels other than the optical. The introduction of optical add-drop multiplexers (OADM) makes it possible to connect some nodes directly, by-passing that is some of the intermediate nodes and creating a direct optical path for a certain signal to reach the node it is destined for. However, this is far from the vision of the all-optical network where all the routing functionality will be done in the optical domain. The implementation of all-optical networks will have significant consequences that have been extensively analysed within the field of optical communications. The introduction of optical network functionality at the node is the major area of interest in the field of optical communications and the realisation of good performance all-optical or nearly all-optical networks is the main motivation behind nearly all of the work carried out in the field.

Wavelength Division Multiplexing (WDM) is used to multiplex many optical channels in one fibre. At the receiving end the signal is divided back to its original constituents and each wavelength is received on a separate receiver that is accordingly tuned to the right frequency/wavelength. The number of channels in a WDM transmission system has increased dramatically in the past three years. Fixed wavelength transmitters are used and WDM systems with two hundred WDM channels in one fibre, have been announced by systems producers. WDM is today used for capacity increase yet the real driving force behind its tremendous development is the prospect of optical networking. The wavelength of the channel is used to identify the signal in the optical domain so that it can be directed as necessary without the need for demultiplexing and reading of the content of the signal itself.

One of the main building blocks of the (all-) optical WDM network is the optical cross-connect (OXC). This is a controllable NE that is used at the node to direct optical signals to the right output. Any optical signal that arrives at a certain fibre input to the node will be switched over to the fibre output that will ensure that this signal follows the right path towards its end destination. A typical OXC ought then to be able to switch each one of those (100) wavelengths from each one of the input fibres (minimum of two) to the right fibre output (between a minimum of two output fibres). OXCs are just becoming commercially available, primarily electro-optic versions of these with far from ideal performance and quite high cost. The sheer size, cost and complexity are such that it has not been proved possible to realize an OXC of admissible specifications/performance for a real implementation. The complexity and cost of an OXC increases dramatically as a function of size, the size being defined as a function of the total number of wavelengths as well as the number of fibre inputs and outputs. In addition, unrealistically stringent performance requirements are placed upon the components the OXC (e.g. optical switches). It is quite likely that better OXC may be realized in the future, yet it has become clear that technical limitations will render it practically impossible to realize a large high capacity all-optical network that comprises cascades of large OXCs. This constitutes a considerable limitation for the realisation of optical networks which has been a major delaying factor to their introduction.

Recently, a hard-wired OXC that functions as a passive wavelength router was described. See Chen et al., "Fiber Bragg Grating-Based Large nonblocking Multiwavelength Cross-Connects," Journal of Lightwave Technology, Vol. 16, NO. 10 (October 1998), the entire content of which is hereby incorporated by reference. In this device, each wavelength from each input is directed to a predetermined output, and at the same time, signals carried by the same optical wavelength originating from different inputs are directed to distinct outputs, a functionality that is central in a cross-connect as indeed its name implies.

SUMMARY OF THE INVENTION

An object of the present invention is to provide a method for the realisation of a network where no switching elements, such as the OXC or others, are included at the node.

Some known networks can be considered switchless network. For example, a simple ring network with non configurable OADMs is a switchless network. In the case of a star network, a star wavelength demultiplexer has been used to provide dedicated wavelength connections from node to node. These two network architectures can be used in the access or the regional area network. However, in the backbone network area and for larger scale networks, mesh architectures are practically required. Star networks suffer unacceptable protection problems to be implemented in the backbone area where full protection is required and make a very inefficient use of the available fibre infrastructure. OADM rings offer low functionality in relation to a mesh, resulting in long transmission lengths and a rather wasteful use of the optical bandwidth. In order to realize a mesh optical network, an OXC is generally required exactly because many choices of direction are present for each signal at each node. One of the main contributions of the present innovation is to devise a method for the realisation of a switchless mesh network with the possibility to attain the performance that is required from today's networks. This features simultaneous connections between all node-pairs, high bandwidth between the nodes, 1+1 (1:N) protection, dynamic bandwidth allocation, and efficient use of the bandwidth available in the fibre. Obviously, lower performance is also attainable.

In accordance with a first aspect of the invention there is provided an optical network comprising a plurality of nodes, optical fibre transmission lines connecting the nodes, at least one transmitter and/or at least one receiver in each node, and at least one wavelength router. The router is operative to route at least one wavelength band that contains more than one consecutive optical channel. The optical network can be a mesh, a ring, a star or a bus network, or combinations of these.

In accordance with a second aspect of the invention there is provided an all-optical network comprising a plurality of nodes, optical fibre transmission lines connecting the nodes, at least one transmitter and/or at least one receiver in each node, and at least one passive wavelength router, wherein the network is a transparent/passive medium with a set of fixed wavelength dependent rules, with a plurality of paths connecting the nodes, the network being a mesh network, a path of an optical signal propagating through the network being determined at the transmitter by choosing the transmitted wavelength of the optical signal, the paths of the network being predetermined according to the set of fixed wavelength dependent rules.

In a preferred embodiment the transmitters in at least some of the nodes are tunable lasers. The receivers in at least some of the nodes can be fixed wavelength receivers or tunable wavelength receivers.

The set of fixed wavelength rules comprises preferably restrictions of the directions of a transmitted optical signal, first in purely geometrical/spatial terms and second as dependent upon the wavelength of the signal.

In another preferred embodiment the router is a wavelength band router, and wavelength bands are then routed around the network. To provide reconfigurability of the wavelength routers arranged in at least some of the nodes, at least one switch may be arranged in these nodes. It is also possible to increase the wavelength reuse and the flexibility of the network if at least one wavelength converter is arranged in at least some of the nodes.

In another preferred embodiment of the all-optical network according to the invention, two optical fibres can be arranged between each pair of neighbouring nodes, the routers providing two physical layers in the network, each physical layer including preferably all of the nodes, to provide bidirectional connection between all of the nodes in the network, the transmission in each fibre being unidirectional.

One may also provide multiple optical fibres between each pair of neighbouring nodes, the routers providing multiple physical layers in the network, each physical layer including preferably all of the nodes, to provide bidirectional connection between all of the nodes in the network, the transmission in each fibre being unidirectional.

The transmission in the fibres in the network may be bidirectional.

In accordance with a third aspect of the invention there is provided a passive wavelength router for an optical network, wherein at least one combiner for combining a number of input optical signals, and at least one circulator for providing a number of input optical signals to a number of outputs, reflective filters being implemented at a number of the outputs. Alternatively, a passive wavelength router may include a circulator for receiving a single input and a power combiner that combines several outputs. In this case, each input to the node is routed to several outpouts using passive wavelength filters. For routing more than one input into several outputs, several of such single-input-circulator/power-combiner blocks can be combined.

For illustration purposes, the embodiments of the present invention are discribed herein using circulators. However, the function performed by the examplary circulator can be performed by various combinations of couplers, as would recognize a person of ordinary skill in the art. Therefore, the present invention is not intended to be limited to using circulators in the routers described herein, but is intended to include various combinations of couplers that perform an equivalent function.

In accordance with a fourth aspect of the invention there is provided a passive wavelength router for an optical network providing bidirectional connection between nodes in the network, the transmission in each fibre being unidirectional, wherein the router comprises a first and a second single layer router, each single layer router comprising at least one combiner for combining a number of input optical signals, at least one circulator for providing the input optical signals to a number of outputs, reflective filters being implemented at a number of outputs, wherein various inputs and outputs of the first and second single layer routers are connected.

In accordance with a fifth aspect of the invention there is provided a passive wavelength router for an optical network providing bidirectional connection between nodes in the network, the transmission in each fibre being bidirectional, wherein the router comprises a number of single layer routers and a number of circulators, each single layer router comprising at least one combiner for combining a number of input optical signals, at least one circulator for providing a number of input optical signals to a number of outputs, wavelength reflective filters being implemented at a number of the outputs, wherein various inputs and outputs of different single layer routers are connected.

In accordance with a sixth aspect of the invention there is provided a passive wavelength router for an optical network providing preferably bidirectional connection between nodes in the network, wherein the router comprises a number of single layer routers and a number of circulators, each single layer router comprising at least one combiner for combining a number of input optical signals, at least one circulator for providing a number of input optical signals to a number of outputs, wavelength reflective filters being implemented at a number of outputs, wherein various inputs and outputs of different single layer routers are connected by simple fibre connections or via additional circulators.

The routers are preferred to be operative to route wavelength bands and the wavelength reflective filters are preferably broadband wavelength reflective filters or broadband Bragg filters. The combiner is in the general case a simple power combiner but may also be wavelength dependent.

In accordance with a seventh aspect of the invention there is provided a method for implementing an all-optical network, the network comprising a plurality of nodes; optical fibre transmission lines connecting the nodes; at least one transmitter and/or at least one receiver in each node, and a passive wavelength router; the network being a passive medium with a set of fixed wavelength dependent rules, the network being a mesh network with a plurality of paths connecting the nodes. The method including the step of determining the path of an optical signal propagating through the network by choosing at the transmitter the transmitted wavelength of the signal, the paths of the network being predetermined according to the set of fixed wavelength dependent rules.

The set of fixed wavelength dependent rules comprises preferably restricting the directions of a transmitted optical signal, first in purely geometrical/spatial terms and second depending upon the wavelength of the signal.

Preferably wavelength bands are routed in the network.

Time-division multiplexing may be implemented by rapid switching of the transmitter wavelength, allocating a time slot to each path handled by said transmitter. The transmission of internet protocol (IP) packets and transmission of asynchronous transfer mode (ATM) cells through the network may also be provided with the method of the invention.

By introducing at least one switch in at least some of the routers a certain re-configurability of the routers are provided and implementing wavelength conversion by providing a wavelength converter in at least some of the nodes, increases the wavelength reuse within the network and the flexibility of the network.

Full connectivity between all the nodes in the network may be realized by splitting the infrastructure of a two-dimensional optical network in two physical layers and then interconnecting the two layers through the routers making a three-dimensional network.

In accordance with an eighth aspect of the invention there is provided a method for interconnecting at least two optical networks, the optical networks being of the type defined above. The method includes the step of using a network layer comprising reconfigurable wavelength routing network elements in at least one of the nodes as a main network layer, and using the optical networks as sub-networks of the main network, the connections between the main network and the sub-networks being provided in at least one of the nodes of the main network. Preferably optical cross-connects (OXC) are used as the reconfigurable wavelength routing network elements in the nodes of the main network.

Recapitulating, the present invention is directed to a new method of routing wavelength bands. Conventional WDM systems, network elements and networks, are designed to handle/route individual wavelengths. Although many individual wavelength channels can be handled at a time in conventional networks, channels are still handled individually and are de-multiplexed and multiplexed and routed individually. Instead, the present invention proposes routing individual channels and/or wavelength bands that consist of more than one individual wavelength channel, by the components (network elements) and/or by the network. This routing can be accomplished for any type of optical network (any topology or architecture).

The present invention is further directed to a new network and a new method for routing signals within an optical network, wherein the network includes a mesh all-optical network using passive wavelength routing at the node. Passive components provide a mesh network of virtual (i.e. possible) direct paths for end-to-end connections between the nodes of a network. Depending on the available fibre infrastructure that connects these nodes, a mesh of virtual paths is created by:

a) allowing only a selection of possible "flows" for all signals in geometrical terms (e.g. only transmissions towards S, E, S-followed-by-E are possible etc.), and b) applying wavelength dependent rules for these signals as well as flow-direction dependent rules (i.e. the same wavelength may follow a different path if it enters a node from S than if it had entered the node from E).

Such a network may be considered as a passive medium with possible end-to-end paths where the intermediate nodes are—logically—invisible. Which paths are in use is decided by the management system.

A regular grid network is a simple example of a mesh network. Routers can be placed at locations that do not correspond to nodes in order to simplify the design in the general case. The present invention can be applied to any topology.

An optical network according to the present invention may include for example:

1. Fixed wavelength lasers and fixed receivers. This embodiment provides some flexibility by choosing different lasers at the transmitter side. In this embodiment, the routing function is performed electrically at the transmitter side.
2. Arrays of lasers and fixed receivers.
3. Arrays of lasers or fixed lasers and tunable receivers.
4. Tunable lasers or arrays of lasers and fixed receivers. This embodiment offers a lot of re-configurability, restoration, and allocation of bandwidth on demand.
5. Tunable lasers or arrays of lasers and tunable receivers. This embodiment offers maximum flexibility.

The "rules" mentioned above can be fixed. However, the network flexibility can be increased by making the rules "re-configurable". This may be achieved by adding:

1. Switching elements at the node (that switch the direction of the signal).
2. Wavelength conversion at the node.

Advantageously, the network of the present invention can scale beyond the limits that are defined by the maximum number of wavelengths by means of a hierarchical architecture. A separate top network can serve to interconnect a number of sub-networks, which work based on the principle of the present invention. The top network can be switched or switch-less.

As mentioned above, the present inveniton includes passive wavelength routers. In one embodiment, a passive wavelength router has a plurality of input fibres and a plurality of output fibres. The passive router can be built using conventional passive optical components and routes passively groups of wavelengths to its different outputs based on a set of predetermined rules that depend on:

a) the entering port of the signal, and/or b) the wavelength of the signal

In the passive router of the present invention, signals are not cross-connected i.e. signals from different inputs that are carried by the same optical wavelength (or frequency) are not exclusively directed to different outputs. In other words, signals from two (or more) different input ports that are carried by the same optical wavelength (or frequency) may be directed to the same output. Which of two or more such "colliding" virtual paths is active, can be determined by a management system.

Two examples of the above router are later discussed for the case of a grid network. In one example the signals from some of the inputs are added and then routed on. In another example the input ports are treated individually and then several outputs are combined.

The drop function can take place individually at each input port. Alternatively, many input ports may be combined, and the drop function can be performed on the composite.

The add function can take place individually at each output, after routing has otherwise taken place. Alternatively, the add fucntion can take place before (at least part of) the routing has taken place for a combination of outputs.

As mentioned above, switching elements can be added to add some re-configurability to the functionality of the router. Similarly, wavelength conversion elements can be added to add some re-configurability to the functionality of the router. In one embodiment, the router routes bands of several consecutive wavelength channels.

Packet switching or cell-routing can be realised over the network of the present invention. IP, ATM, etc, can be carried directly over WDM using the network of the present invention. The optical network as stated above and the method for implementing an all-optical network as stated above may be used for providing a national backbone network, a Regional, a Metropolitan or an Access Network.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11A shows a simple 3-by-3 router, and FIG. 11B shown a 4-by-4 router.

DESCRIPTION OF THE PREFERRED EMBODIMENTS

Figure 1:
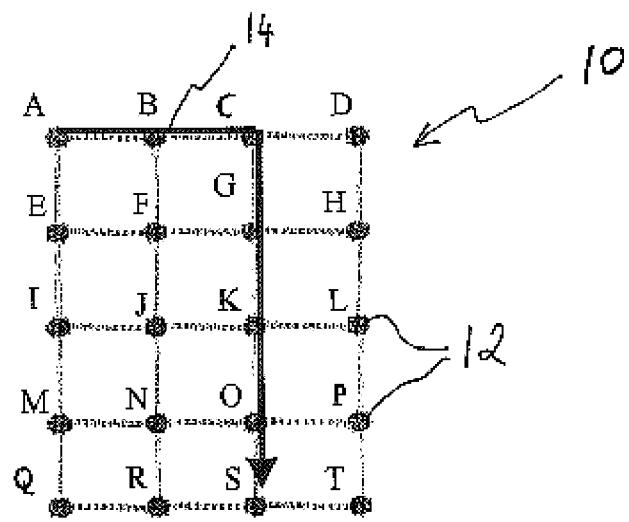
FIG. 1 shows an example of a regular mesh network according to the present invention.

Referring now to the drawings, a more detailed description of the present invention is given below, wherein like reference numerals designate identical or corresponding parts throughout the several views.
Tunable Programmable Transmitter A high performance reconfigurable switchless network according to the present invention preferably includes a tunable programmable transmitter. When neither the transmitter nor the receiver are tunable, then the network functionality is rather inflexible. Widely tunable lasers are good candidates as transmitters for a flexible re-configurable switchless network, and such modules are emerging or commercially available.

Tunable lasers that have been developed to date are primarily multi-section DFB (Distributed Feedback) and DBR (Distributed Bragg Reflector) lasers, although there are a variety of other tunable structures such as the TTG (Tunable Twin Guide) laser. The tuning ranges for these types are normally in the 1–10 nm ranges. A common feature for all these lasers is that the wavelength tuning is proportional to the variations of mode refractive index of the laser waveguide, which limits the tuning range.

Several ways have been proposed and demonstrated to overcome this limitation. One method is to use vertical codirectional couplers inside the laser as an intracavity filter. This filter is widely tunable but consequently poorly selective. Examples of this kind of laser are the vertical coupler laser proposed by Alferness et al. "Widely Tunable InGaAsP/InP laser based on a vertical coupler intracavity wavelength filter" OFC, 1992, the entire content of which is hereby incorporated by reference, and the ACA laser proposed by Illek et al., "Codirectionally coupled twin-guide laser diode for broad band electronic wavelength tuning", Electron. Lett., Vol. 27, pp. 2207–2208, 1991, the entire content of which is hereby incorporated by reference.

Wide tunability can also be achieved using double-sided DBR with comb-like reflectance with slightly different peak separations. The wavelength selection is done by the Vernier effect. These lasers use two Sampled Grating DBR (SG-DBR) or Super Structure Grating DBR (SSG-DBR) with slightly different sampling periods. The SG-DBR (described in Jayaraman et al., "Extended tuning range in sampled grating DBR lasers", IEEE Photon. Technol. Lett., Vol. 5, pp. 489–491, 1993, the entire content of which is hereby incorporated by reference) is conceptually simpler but inferior and less flexible than the SSG-DBR (described in Ishii et al., "Multiple phase shift super structure grating DBR lasers for broad wavelength tuning", IEEE Photon. Technol. Lett., Vol. 5, pp 613–615, 1993, the entire content of which is hereby incorporated by reference). The tuning characteristic is strongly dependent on the design parameters and on the homogeneity of the reflection of each SG-DBR or SSG-DBR. This type of laser is commercially available.

An extra filtering mechanism can be added to improve the performance. The GCSR (Grating Coupler Sampled Reflector) laser combines a vertical codirectional coupler with an SG-DBR or a SSG-DBR as an extra filter. This type of laser is now commercially produced.

For both the GCSR and the SSG-DBR laser total tuning ranges exceeding 100 nm have been achieved, and complete wavelength coverage over the whole Er window (40 nm) has been demonstrated. Direct modulation at 4 Gbit/s has been reported, as well as switch times below 10 ns. The above-described lasers can thus be used in the present invention.

Other known widely tunable lasers that can be used in accordance with the present invention are various kinds of Y-lasers. These lasers have 2 or 3 lasing cavities with different lengths formed by Y-branch from a common waveguide. By controlling the index in the different branches by electrode separation, tuning is obtained. The sections are normally all active. However, these lasers can have poor SMSR and complicated and critical wavelength control.

Alternative approaches to widely tunable lasers for wavelength agile transmitters for the present invention are integrated DFB arrays, phased array lasers, and external cavity lasers. The two former approaches are not tunable lasers but rather lasers that can be set to any of a number of fixed wavelengths. The DFB array approach has the advantage of using the more mature DFB technology, where a relatively low wavelength drift can be established. Phased array lasers utilize the phase relation between a number of curved waveguides for wavelength selection, which in principle could give a low wavelength drift. An example of a DFB laser array is described in Zah et al., "Multi-wavelength DFB laser arrays with integrated combiner and optical amplifier for WDM optical networks", J. Sel. Top. QE, Vol. 3, pp.584–597, 1997, the entire content of which is hereby incorporated by reference. Disadvantages, however, for both these approaches, are that the chips are large and complex, and thereby inherently more expensive than tunable lasers, and also that the wavelength channels and spacing will be determined by chip parameters which reduces flexibility and yield. External cavity lasers use feedback from a mechanical arrangement outside the laser chip. These lasers can give excellent stability, but are in general bulky, not rugged and quite expensive to fabricate.

A wide wavelength coverage is also possible by arranging a plurality of narrowly tunable lasers, where the tuning ranges stitch to each other, and combining the light from these lasers into a single fibre by a waveguide coupler. Such sets of narrowly tunable lasers can be used for the present invention. However, using single widely tunable lasers offers significant advantages as compared to using wavelength matched sets of several narrowly tunable lasers.

Figure 8:
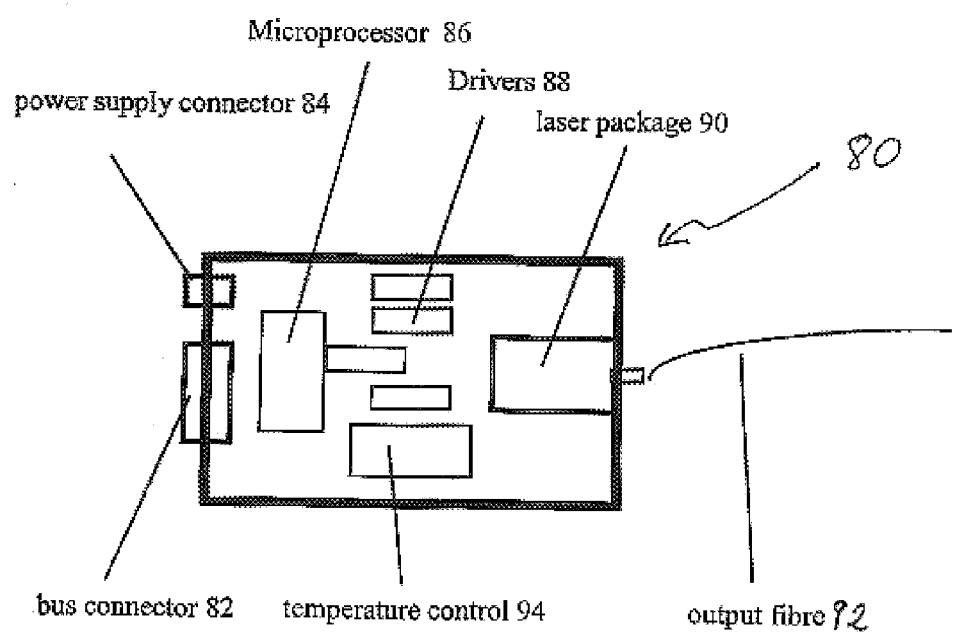
FIG. 8 shows a schematic view of a tunable laser module lay-out.

An exemplary schematic drawing of the tunable laser 80 is shown in FIG. 8. The tunable laser is connected to a bus via a bus connector 82, and is powered via a power supply connector 84. A microprocessor 86 controls drivers 88 which drive the laser package 90. The output of the laser package 90 is directed to an optical fiber 92. A temperature control 94 controls the temperature of the tunable laser elements. The laser can be a four-section laser capable of complete wavelength coverage over the whole Er-window (1520–1560 nm, extendible to 1580 nm). Typical output powers are of the order of a few mW (non fibre-coupled). The WDM transmitters can be set remotely to any wavelength or channel within the whole Er-window, and can be (directly or externally) modulated at 2.5 Gbit/s or 10 Gbit/s at that channel. Other wavelength ranges can be used and the present invention is not limited to the above exemplary 1520–1560 nm range. As the laser permits complete wavelength coverage, the number of channels and the channel spacing can be arbitrary and can be tailored to specific systems needs. The default channel plan of the WDM modules can be the ITU grid with 100 GHz spacing and 193.1 THz centre frequency. Fractions of that spacing can be used in order to increase the total number of channels. For example, half that spacing (50 GHz), allows as much as 128 channels for the assumed tuning range.

The performance of widely tunable lasers has been continually improved in term of tuning range, wavelength coverage, output power and side mode suppression. Quasi-continuous tuning (i.e. all wavelengths within the tuning range are accessed but using more than one cavity mode) of 67 nm in a GCSR laser and 62 nm in SSG-DBR lasers has been demonstrated requiring a three-tuning-current control.

Modules, in which the tunable lasers are driven by four independent current sources and a temperature controller driven by a micro-controller, can be implemented using software. The laser modules can be self-contained units where the only inputs needed are bus commands stating wavelength/channel and power, possibly a modulation signal and a DC power input.

With respect to the long-term wavelength stability of the WDM transmitters, it can be beneficial not to rely only on low degradation rates of the lasers, but also on active devices to stabilize the wavelength, mode and to compensate for any possible degradation. Such devices can include for example a conventional look-up table control system and/or a conventional active feedback system. These devices may be included in the laser subsystem.

The Control System

The network of the present invention is controlled using a control system that may control one or more network layers. The control system controls the network topology, the various network elements, connections in the network, etc. It also carries out performance monitoring and fault management. The control system generally includes a global control system which may reconfigure the network functions by acting upon the local control system at each node or at each network element. The local control system manages for each node—or network element—parameters such as optical power levels, wavelengths, and alarm signals. It may also manage reconfiguration of the node when faults occur.

Figure 9:
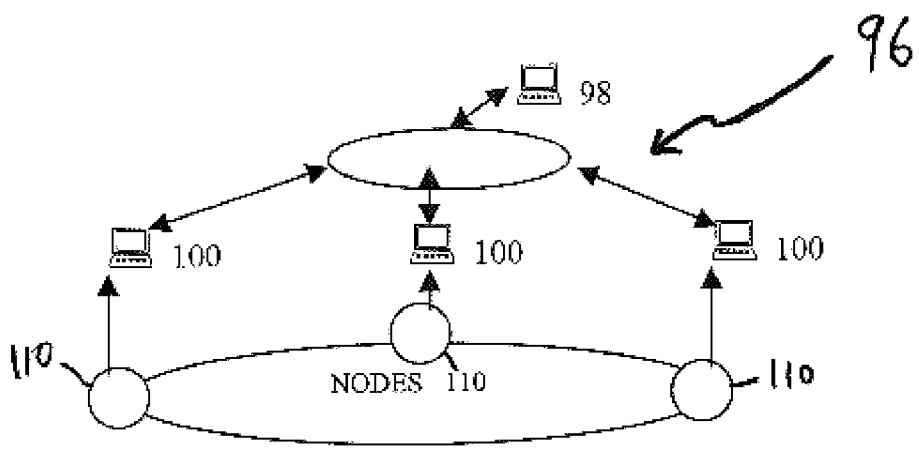
FIG. 9 shows a schematic view of a network management system.

An example of a control system 96 is illustrated in FIG. 9. Generally, the tunable lasers at nodes 1 10 are supervised by the local control system 100, and may therefore also be centrally programmable by the global control system 98. Local faults may be solved locally, for example when the tunable lasers are used as back-up lasers or when a fibre break at the immediate neighbourhood has been monitored. The tunable lasers can be remotely set to any desired wavelength and output power (within the specified range) as well as switched on/off. Hardware and software for the control system are commercially available, as would recognize a person of ordinary skill in the art. The transmitters—whether tunable, fixed wavelength or arrays of lasers—may be in the general case controlled by the local control system 100.

The programmability of the tunable lasers offers the advantage that the control system 98 may remotely reconfigure the network and react fast and efficiently to immediate traffic routing/re-routing demands, be it in order to optimize the drift of the network or in order to provide protection routes. In addition, the programmability of the lasers allows accuracy of the laser wavelengths with respect to the same reference as well as correction for ageing effects. These are valuable characteristics that enable smaller channel spacing irrespective of the network solution that is implemented.

Switchless Mesh Network An underlying principle to realize a switchless mesh network is that passive 15 fixed-wavelength filters at the nodes create fixed wavelength-dependent paths ("colour highways") across the network. At any point in the network the direction an optical signal can follow is explicitly determined by its origin and its wavelength. The fibre network itself is a passive medium with a set of fixed rules. In order to establish a connection between one node A and another node B, a suitable wavelength must be chosen at the transmitter so that the signal is directed along one of the colour highways where both A and B belong. For applications in the backbone area, at least two independent physical routes must be available for each node pair for protection purposes, whereas this rule may be relaxed in other parts of the network. The receiver end requires a wavelength filter so that the correct signal can be extracted. Dedicated wavelengths may be allocated for reception at each node and the receivers may then comprise fixed wavelength filters for signal extraction. Alternatively, tunable programmable filters may be implemented at the receiver end so that bandwidth can be shared among nodes and allocated on demand. This allows dynamic allocation of the network resources and good wavelength reuse possibilities. On the other hand, the receiver needs to be notified in order to establish a connection.

Wavelength Budget Along a Colour Highway and Bandwidth-on-Demand

Assume a N×M mesh network and as an example assume a network 10 that consists of twenty nodes 12, as shown in FIG. 1. Assume further a connection between two edge nodes that belong to a different row and column each. A connecting path 14 may be chosen as shown in FIG. 1. A set of wavelengths can then be allocated for all communications between any of the nodes within this path in the direction from A to S. In this example the path consists of seven nodes, namely A, B, C, G, K, O, S and a total of 21 connections between nodes are needed in order to provide one optical channel to each node-pair in the direction from A to S. However, since these connections do not all share the same fibre, wavelengths may be reused. For example, the same wavelength may be used in connection AB as in BC, CG, GK, KO, OS. Another wavelength may be used for AC, CK, and KS. Therefore the minimum total number of wavelengths required to cover these 21 node-pair connections is actually 13. Instead of allocating the minimum of 13 wavelengths that ensures that all connections are possible within this "one-way highway", a number of extra wavelengths can be assigned to this route, for example twice as many wavelengths as the minimum required number. This extra capacity may then be allocated on demand so that local connection-needs within this group of nodes can be met when they arise. If bi-directional transmission on one fibre is considered, then the wavelength budget has to be doubled.

A Switchless Mesh Network Using Unidirectional Transmission in Each Fibre, and One Fibre Pair Between Neighbouring Nodes There are many ways to realize a switchless mesh network, depending on the number of nodes, the capacity needs between these nodes, the number of fibres connecting the nodes, the number of available wavelengths, and the capacity carried by each wavelength.

The general method is to use more than one physical layer in parallel in order to realize each switchless mesh. Each physical layer may consist of all or parts of the total number of nodes. Within each layer the directions a signal may be transmitted are restricted firstly in purely geometrical terms (restriction of flow-directions) and secondly as dependent upon the signal's wavelength (wavelength dependent rules). For a purely switchless mesh, there is no possibility to reconfigure the node functionality as far as the routing direction is concerned and the only function that can be configured at the node is the add-drop function (optionally). End-to-end optical connections are determined explicitly at the end-nodes, or more accurately at the transmitter side whereas the receiver must be notified in the cases where full dynamic bandwidth allocation is used.

We proceed to find a suitable solution for the case where unidirectional transmission is used in each fibre and assume there are no more than 2 fibres available between each pair of neighbouring nodes. This is an example of a network design that serves to clarify the design principle and method of th present invention.

Figure 2:
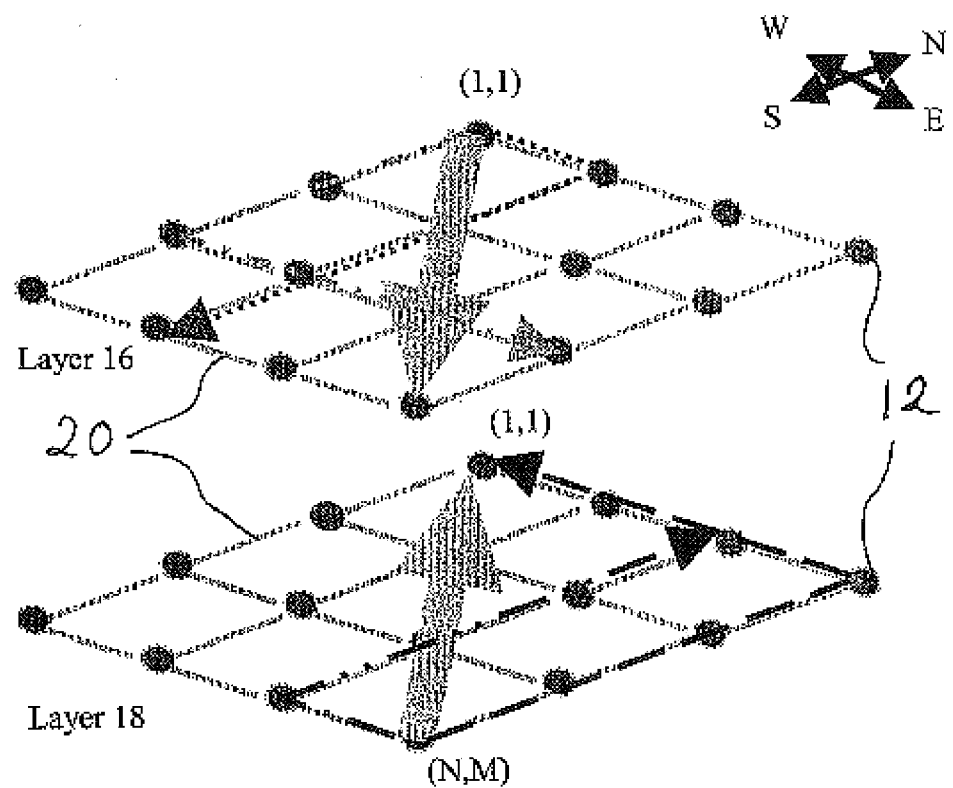
FIG. 2 shows a N×M switchless network realized by two physical networks according to the present invention.

FIG. 2 shows two separate physical layers 16, 18 that comprise N×M nodes 12 each, each with dedicated fibre infrastructure. In FIG. 2 the nodes 12 are denoted by circles and are pictured once for each layer. It should however be pointed out that there are only N×M nodes in total in FIG. 2, but pictured as explained above for ease of the following explanation. The lines connecting the nodes are optical fibres 20. Within Layer 16, one of the diagonals is chosen as well as a flow direction within this diagonal. For the example in FIG. 2, the diagonal from node (1,1) to node (N,M) can be the selcted flow-direction of possible flow-directions, as shown by the thick grey arrow. A distinct flow-direction is subsequently chosen in Layer 18. For example, the opposite flow-direction, i.e. from (N,M) to (1,1) can be selected. The four transmission directions that are possible in this systems are shown in the top right corner of FIG. 2 and denoted by N for north, E for East, S for south, W for west. Only flow "parallel" to the assigned diagonal is subsequently allowed in each layer. In other words, network-wide routing restrictions, i.e., shared by at least several of the routers in the network, are imposed restricting routing of optical signals to a selection of possible flow-directions. This means that only connections that involve east- and/or southbound movements are allowed in Layer 16, and west- and/or northbound are allowed in Layer 18. "Colour highways" are established in each layer in the flow-directions mentioned above. Examples of such highways are shown by the thin dotted arrows in FIG. 2. Connections within the same row or column are the simplest in this context in that no turning or change of direction is involved. These can be realized by sending the signal in the right direction and informing the receiver to tune to the right channel. Therefore, with these two layers 16 and 18, all node-pairs that belong to the same row or column can be directly connected, as well as 50% of the rest of the connections. For example, the connection from node E to node B (in FIG. 1) is not allowed with this solution since the eastbound movement is only admissible in Layer 16 whereas the northbound is only admissible in Layer 18. However, all inter-node connections become possible if the two layers 16 and 18 are interconnected either at each node or at a selection of nodes. The case where all nodes provide inter-layer connections will be used as an example in the following, although a similar solution can be found for other sub-sets of nodes performing this task.

Figure 3A:
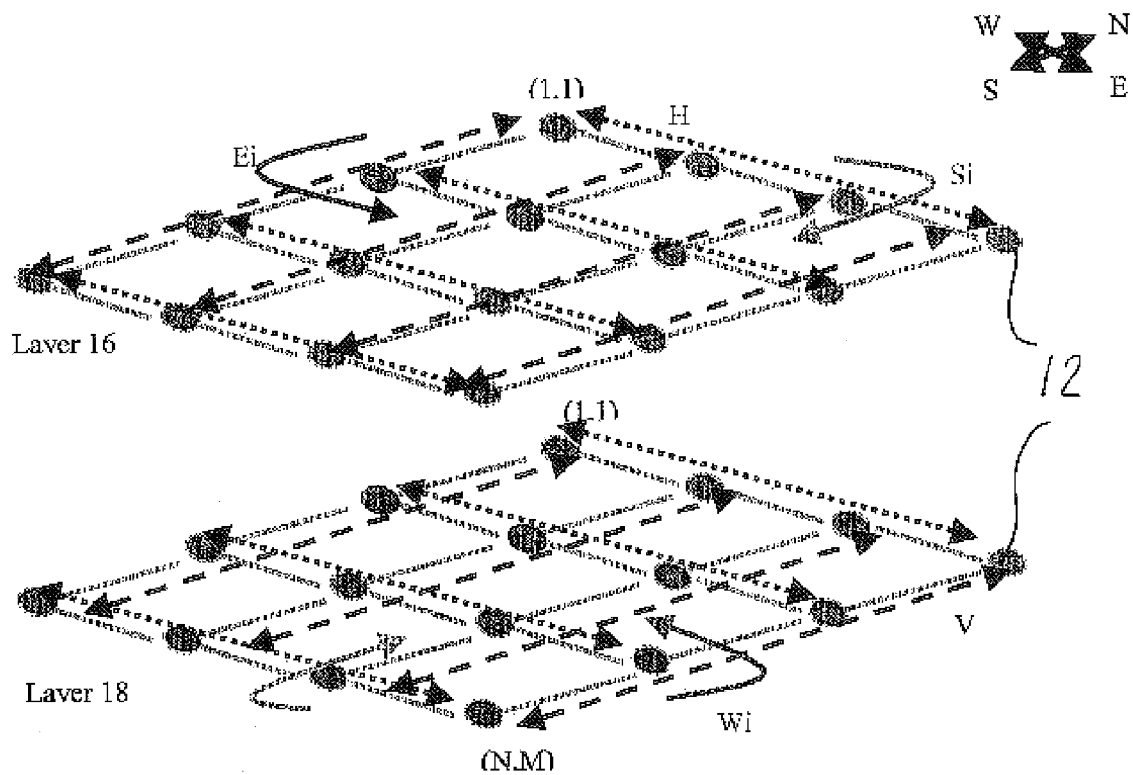
FIG. 3A is a schematic of band-allocations within each layer in an optical network according to an embodiment of the present invention.
Figure 4:
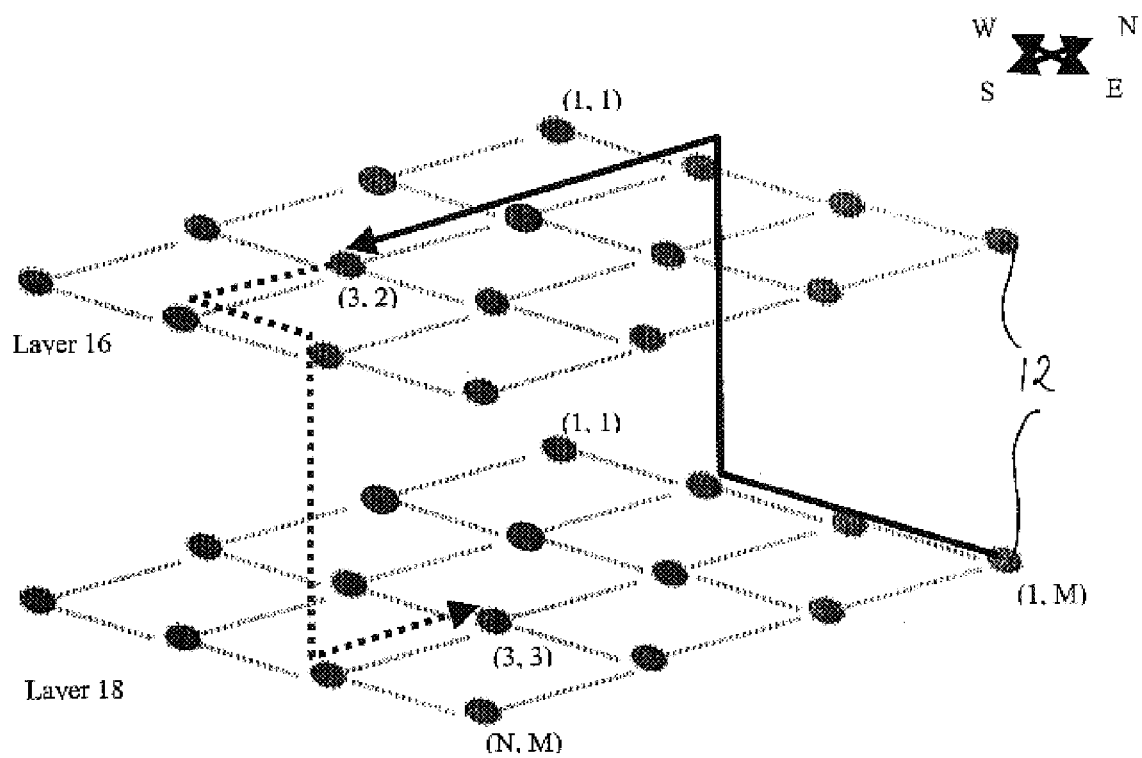
FIG. 4 shows two examples of interlayer connections in an optical network according to the present invention.

As mentioned earlier, the combinations east-south (south-east) and north-west (west-north) are possible with the two physically separate layers 16 and 18 in this example. In order to be able to connect all node-pairs it is required that the combinations east-north (north-east) and south-west (west-south) are also possible, as schematically shown in FIG. 3A. This can be achieved by interconnecting the two layers 16 and 18. An additional reason for interlayer connections is to provide alternative routes for protection purposes. Note that the availability of two independent routes is a preferred in the case of the backbone network where all nodes talk to each other at all times and heavy traffic is carried at each link. Whereas two independent routes are available for most node-pairs in the scheme that is devised thus far, connections between two nodes that are in the same row or column can only be achieved by the direct (i.e. shortest) route. As an example, in case of a fibre cut between B and C, e.g., in FIG. 1 the direct connections AC, BC, BD can be protected if A-E-F-G-C, B-F-G-C, B-F-G-H-D are possible respectively. This can be solved as shown in FIG. 4, which shows two examples of interlayer connections. Such connections require layer crossing in both directions between Layer 16 and 18.

Routing Algorithm

A large part of the routing strategy is already described above. However, if dedicated wavelengths are used within each of the "colour highways" in FIG. 2, the total minimum number of required wavelengths is several hundreds for the example network—a number that is unrealistic with today's technology and even if realisable in the future it will in any case cause a lot of engineering problems. This number can be reduced dramatically if a smart algorithm is used for wavelength allocation, e.g. by imposing wavelength dependent rules for the optical signals. There are again more than one method to achieve this, an example is given in the following.

Connections Within One Layer

A group of wavelengths is allocated for connections within each set of nodes as depicted in FIG. 3A. The double-ended arrows in FIG. 3A show which nodes will be interconnected by the corresponding wavelength group. Note that the number of wavelengths within each group is a design parameter and ought to be a function of the number of nodes that are to be served by this group. Wavelength group H (horizontal) is used for connections within a row while V (vertical) is used for connections within a column. Additional wavelength groups are allocated, where groups Ei for i=1 . . . N denote turning east and are used specifically for connections that involve first a movement within a column followed by a movement within a row for each of the N rows, whereas groups Sj for j=1 . . . M denotes turning south and are used specifically for connections that involve first a movement within a row followed by a movement within a column for each of the M columns. Similarly, groups H and V are assigned in Layer 18, as well as groups Wi to denote turning west and groups Nj to denote turning north. These connections are internal to each layer so that the very same set of wavelengths can be used within Layer 16 as within layer 18. Groups Ei, Sj, Wi, and Nj are partly overlapping.

Figure 3B:
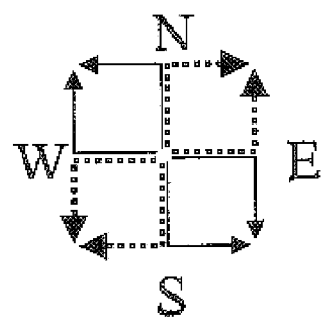
FIG. 3B is a schematic showing the primary flow-directions in FIG. 3A.

As shown in FIG. 3B, eight primary flow-directions need to be possible in a regular mesh in order to attain direct connections between all node pairs. Only four of them are covered by the layered network in FIG. 3A, namely those shown with full lines in FIG. 3B.

Connections Between the Two Layers

Interlayer connections are needed in order to realize all node connections and to provide alternative routes for all connections. Two examples of such interlayer connections are shown by the two arrows in FIG. 4. Since the same wavelengths are shared in the two layers 16 and 18, an algorithm is required for the wavelengths used in interlayer crossing. This can be provided by the following exemplary rule: each signal crossing from one layer to the other will have to perform a final connection movement within the second layer. The direction of this movement as well as the number of the column or row where this takes place will explicitly define the group where the signal shall be carried. For example, for the connection from node E to node B in FIG. 1, the final direction is northbound in column 2 so that group N2 must be used. In FIG. 4, the full-lined arrow shows a connection from node (1,M) to node (3,2). This wavelength needs to be added to group S2. The dashed arrow has to be added to group N3 so that—among others—the connection from node (3,2) to (3,3) will be protected.

In addition, since the routes (paths) followed by the signal are well arranged, wavelength reuse can be applied. For example, the wavelength group used for signals originating from Layer 18 and entering Layer 16 at (1,2), can be the same as the wavelength group used for connections between the neighbouring node (1,3) and column 4 in Layer 18. These signals never cross nor run parallel to one other and therefore the same wavelengths can be used.

In a more general sense, the network discribed above can be viewed as a network in which network-wide routing restrictions are imposed so as to restrict routing of optical signals at the nodes to a selection of possible flow-directions within the optical network, the flow-directions being defined by dividing logically a physical fiber infrastructure of the network in at least two layers, wherein at least one selected flow-direction in one layer is distinct from all selected flow-directions in another layer, and in which wavelength dependent rules are imposed for the optical signals. In a preferred embodiment, the layers are interconnected at least at one of the node. In such a network, the control system can be configured to control the optical transmitters and/or the receivers thereby controlling end-to-end paths of the optical signals through the optical network.

Router Functionality

Figure 5:
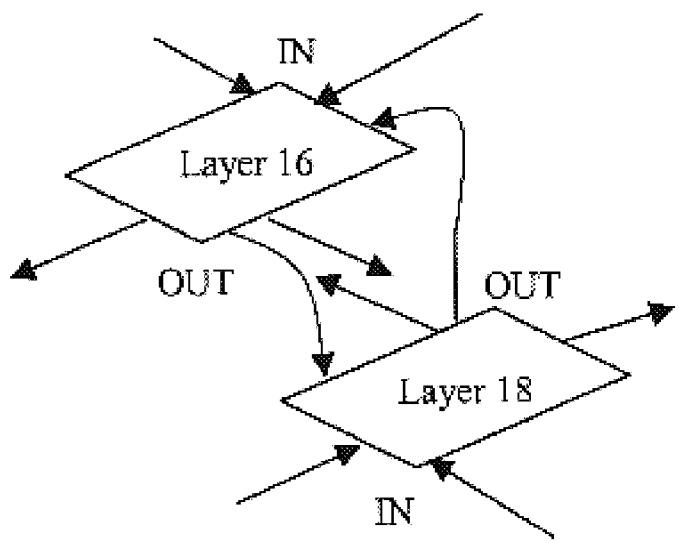
FIG. 5 illustrates the functionality of a passive router according to the invention.

The required router functionality for the network example studied thus far, and depicted in FIGS. 2, 3A, 3B and 4, is shown in FIG. 5. The router can be seen as consisting of two very similar parts, one within Layer 16 and one within Layer 18. Each of these two generic parts has three inputs and three outputs, as a result of the assumed geometry of the network in FIG. 1. As it is shown in FIG. 5 one of the outputs of Layer 16 is connected to one of the inputs of Layer 18, and one of the outputs of Layer 18 is connected to one of the inputs of layer 16. This implies that one of the outputs and one of the inputs of each generic part route between the two layers, whereas two of the inputs and two of the outputs provide routes within each layer. Similar structures can be used for another network geometry.

Router Realisation

Figure 6:
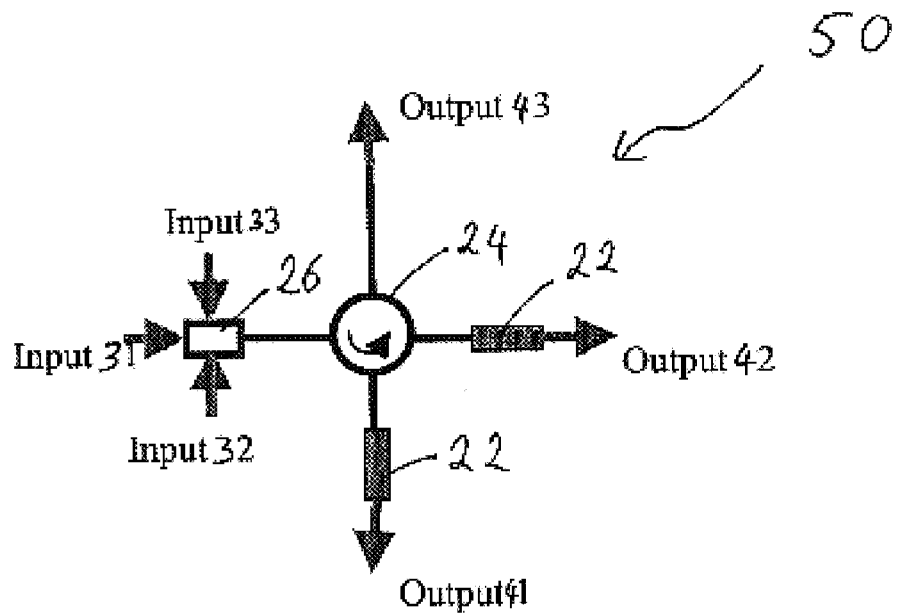
FIG. 6 is a building block representation of the router of FIG. 5.

The router functionality shown in FIG. 5 can be realized by combining two single-layer routers 50 as the one shown in FIG. 6. The basic building block of router 50 is shown in FIG. 6 and includes a set of wavelength filters 22 and a circulator 24, wherein signals from several inputs (inputs 31, 32, 33 in this case) are combined and then routed to several outputs depending on their wavelength. Three inputs are required in this example where the network comprises two layers (i.e. two fibers between neighboring nodes), as mentioned in the previous paragraph. These are combined in this example using a simple power combiner 26 but the combiner 26 may also be wavelength dependent. Reflection wavelength filters 22 are subsequently used together with a circulator 24 to provide the required three outputs (41, 42, 43). Commercially available and relatively low-cost components of excellent performance can be used.

The optical channels within each routed group may be chosen to be consecutive channels such that they define one (or more) wavelength band that comprises more than one wavelength channel. In other words, a wavelength band is a band with more than one consecutive wavelength channel. In general, a group of wavelength may include one or more wavelengths bands. If such bands of wavelengths—as opposed to groups of single wavelengths—are routed, broadband filters are the best candidates as they increase the tolerances of the system. Broadband Bragg filters with sharp fall off and very high suppression ratios between the transmitted and reflected channels may be used.

Figure 10:
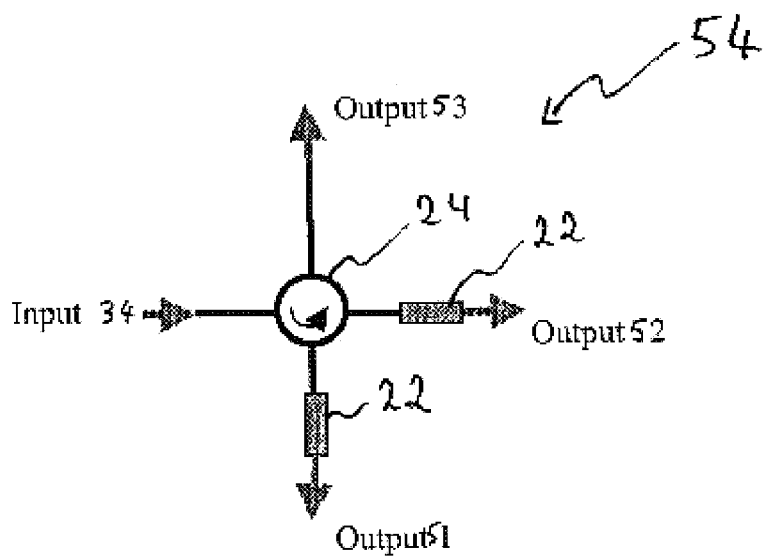
FIG. 10 shows a main building block for the wavelength router according to an embodiment of the present invention.

In the general case, however, the inputs to the node within each layer need not be combined as they are in FIG. 6. The main building block for the wavelength router can perform the routing function for one single input. This embodiment of the present invention is shown in FIG. 10 . In router building block 54, each input 34 to the node 12 within each layer is routed to several outputs 51, 52, 53 using passive wavelength filters 22 and a circulator 24. In order to realize a single-layer router with two inputs and several outputs, several such blocks 54 as the one shown in FIG. 10, need to be combined. In this case, the outputs are combined rather than the inputs. In one embodiment, the outputs can be combined using a power combiner.

The composite wavelength router for the node 12 may be realized similarly to FIG. 5 using several single-layer routers. If one composite interconnection is used from each layer to another, then an additional router 54 like the one in FIG. 10 may be required to route this interconnection to the different directions of transmission that are possible in the second layer. Alternatively, each of the routers 54 in FIG. 10 may have its own interconnection to the other layers (one interconnection per router 54 for each of the layers it may interconnect to). This requires that the output from the router 54 is combined either with an input or with an output in the second layer.

The above exemplary routers are configured to impose network-wide routing restrictions to restrict the routing of optical signals to a selection of possible flow-directions within the network, and are configured to impose wavelength dependent rules. Some of the optical elements described above, such as the circulators and combiners, can be replaced with other well-known optical elements in order to obtain an equivalent functionality for the router, as would be recognized by a person of ordinary skill in the art. The present invention is thus not intended to be limited to an implementation for the routers which uses the examplary optical elements discussed herein.

The Add Function

The addition of signals from the node 12 may take place independently for each of the outputs. In other words, instead of adding signals before the routing function takes place, the signals may be added after the routing takes place, independently at each of the outputs. This maximises the wavelength reuse since the same wavelength may be added to more than one outputs—carrying different signals in the general case.

Irregular Meshes

The mesh structure in FIG. 1 is a regular mesh. Such a regular structure is not always applicable to a real network. However, the logical network may always be built as a regular mesh since routers can be placed at any physical point in the network irrespective of whether a node is present there or not. Additionally, the routing principle is adaptable to a "non-orthogonal" mesh or in fact any mesh network.

Other Network Solutions

Bi-directional Transmission.

Bi-directional transmission can also be used. The principle for wavelength allocation is exactly as before. The only difference is that the total number of required wavelengths for a certain performance is increased because of the fact that the same wavelength cannot be used in both directions in a single fibre. The realisation of the router becomes somewhat more demanding since the inputs and outputs have been effectively increased because of bidirectionality. The basic building block is again as shown in FIGS. 6 and 10. A number of circulators 24 is required to provide connections between the add-drop functions, where i.e., signals terminating at the node are extracted and signals originating from the node 12 are added, and the different parts of the routers as well as to direct the signals correctly at the inputs and outputs of the router.

Higher Node Degree Networks

In FIG. 1, each node has a maximum of four near-neighbouring nodes. In the general case, more than four near-neighbouring nodes 12 may be required. For this as well as other design reasons, in the general case the router may be required to provide a more complex functionality than the one depicted in FIG. 5, with an increased number of inputs and/or outputs as well as an increased number of component combinations. For example a full 2×2 or 3×3 connectivity between all the inputs and outputs may be required. This may also be realized based on the generic arrangement in FIGS. 6 and 10, i.e. based on a combination of combiners 26, circulators 24, and wavelength filters 22 in different configurations.

Three-dimensional Networks

So far we have considered two-dimensional "flat" mesh networks. By splitting the physical infrastructure in two separate layers 16 and 18 and then interconnecting the two, the two-dimensional network is converted to a three dimensional one. This allows direct connections between all nodes 12 despite the restrictions that are imposed within each layer. Direct fibre interconnections between a number of edge nodes is another way to realize a three dimensional network. For example, a direct fibre connection from node (i, M) to node (i, 1) for all i=1 ... N, and from node (N, j) to node (1, j) for all j=1 ... M creates a cylindrical network. This solution requires a somewhat simpler routing algorithm because it is in essence a cylindrical, i.e. a three-dimensional, network. This is, however, probably not the most practical solution in that very long paths twice across the network are needed for some of the connections.

Other Routing Solutions

As mentioned, there is more than one way to realize a switchless mesh network. The use of two layers 16, 18 with one fibre 20 between neighbouring nodes 12 in each layer, is one starting point. All connections may however be easily realized if four separate physical layers are used. The complementary flows, ES/SE, WN/NW, SW/WS, EN/NE are directly allowed in each one of the layers so that no interlayer connections are required. The downside is that a dedicated number of transmitters and receivers must be assigned to each layer at each node. Other similar solutions are possible with various numbers of layers and/fibres in the network. The overall principle is the same. Note that the two-layer switchless mesh is a good compromise with regard to node complexity and infrastructure requirements.

New Network Concept for the Optical Layer

Figure 7:
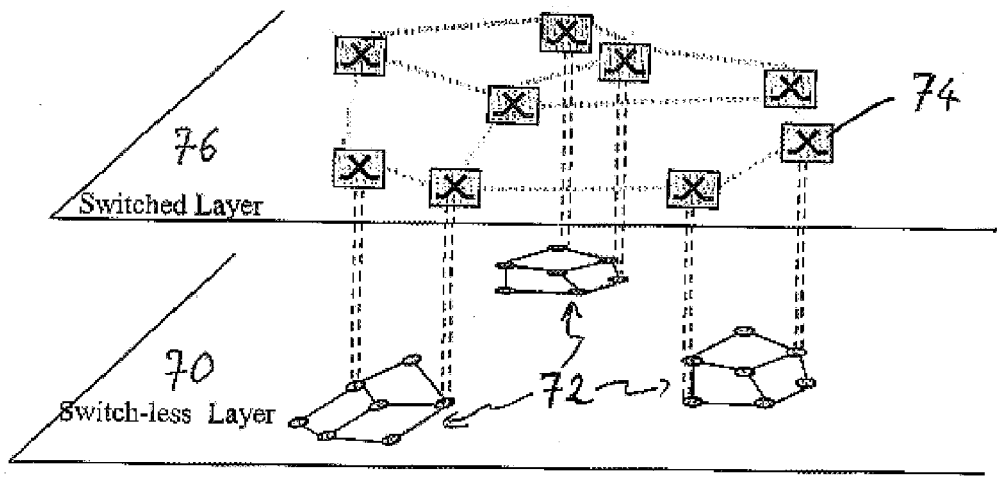
FIG. 7 shows a switched optical network comprising switchless sub-networks according to an embodiment of the present invention.
Figure 7:
Figure 7:

In the foregoing the way to realize a switchless network has been described. The size of such a network is limited. Therefore, a switching mechanism may be required to supplement this concept. A new network concept is proposed here for the optical layer that will solve a number of the problems that are associated with today's conventional concept of an all-optical network which is based on wavelength routing carried out by OXCs. We propose that the physical layer is divided in (at least) two constituent layers 70 and 76 as shown in FIG. 7. The lower layer 70 includes sub-networks 72 that are switchless, i.e. where the routing function at the intermediate nodes in an end-to-end connection is performed using passive components as opposed to active configurable switches and OXCs. Sub-networks 72 can thus be implemented by imposing network-wide routing restrictions restricting routing to possible flow-directions within the network and by imposing wavelength dependent rules, as described above. These switchless islands are interconnected at the switched layer via OXCs 74 or other switching and/or re-configurable elements. The switchless sub-networks can be as large as a typical national European backbone network. In this way a pan-European network, e.g., can be realized using switchless networks at national level that are interconnected via a second layer 76. The requirements posed upon the OXCs 74 in this concept are much simpler than these implied by the conventional WDM network—where i.e. the routing is carried out by OXCs. The number of channels that need to be handled, the number of connections and the number of fibre inputs and outputs involved in the switched layer that is proposed here, are substantially reduced. In addition, the, transmission lengths involved between the nodes in the OXC layer 76 in FIG. 7 are typically such that regeneration of the signals is required. The good quality of the signals that arrive at the switched/OXC layer 76 will result in a relaxation of many of today's limiting factors in OXC realisation e.g. cross talk etc. The common ports between the switched layer 76 and the switchless layer 70 are also natural points where possibly full regeneration could be performed, at a first stage electrically and later optically. Further, this concept ties up well with the new views on network evolution where it is expected that transparent islands will be defined not only due to technical limitations but also because of purely administrative reasons. Alternatively, the top layer 76 may itself be a switchless network. In other words, the sub-networks 72 may be connected by another switchless network, and a cross-connected network at the top of the network hierarchy is not needed. In that case opto-electronic conversion and/or wavelength conversion are needed at the borders between the two layers in the case where the wavelength budget is exhausted within the sub-networks 72.

The implications of the introduction of the network concept(s) we have devised can be quite dramatic. High performance optical networks of the size of a typical national network become possible to realize with existing or state-of-the-art technology. The vision of a dynamic flexible network becomes technically plausible and with realistic economics since the very essence of the concept is intrinsically low-cost. Indeed, big complex and difficult to maintain OXCs are to a significant extent replaced by simple low-cost passive filters. This network concept can become a landmark in the evolution of optical networks as well as communications in general.

Network Characteristics and Extensions

Scaleability

It is clear that the switchless network is not endlessly scaleable. The possibility for additions of nodes should be taken into account in the original plan of the network. There is also an intrinsic limit to the number of nodes that can be accommodated which is explicitly determined by the number of available wavelengths for a given physical architecture and a given set of performance requirements. However, with the existing state-of-the-art in optical transmission systems this upper limit corresponds to a reasonably large network such as the Norwegian national network as we expect this to grow in the next 3–5 years. A further increase of the traffic needs can be accommodated by the use of several switchless networks that are mutually interconnected using another switchless network or by a switched (possibly OXC) layer in a hierarchical network solution. Further improvements will be possible in the future because of advances in the field of optical transmission, tighter channel spacing and increase of the capacity carried by each channel.

Extension to a Partly Switched Network

The addition of a couple of simple switches and/or a number of wavelength converters at the node will provide a limited potential to reconfigure the switchless network for example for upgrade or scaleability purposes. The switching functionality need not be used for ordinary signal routing but rather for reconfiguration of the switchless platform itself.

Upgradeability

When bands of wavelengths are routed, the switchless mesh network is relatively easily upgradeable as far as the number of wavelengths is concerned. The channel spacing can be drastically reduced and be determined at the transmitting and receiving ends without requiring changes at the routing elements. Changes of coding or detection techniques, for example from direct detection to heterodyne detection techniques, can be very easily incorporated without leading to a change of the routing elements. The only exception is the channels that are at the edges of the router band where the roll-off of the filter is a limiting factor. However, guard bands may be implemented at these wavelength ranges to circumvent this problem—albeit with a number of wavelengths being possibly unused. Finally, an upgrade of the filters themselves would not require high investments.

Bandwidth Sharing and Packet Switching Using Time-division Multiplexing

Bandwidth-on-demand can be allocated by this type of network, a characteristic that is in fact one of the advantages of the network concept. When the connections in the network are not semi-permanent, as thus far assumed here, but rather of a highly bursty character, then the additional use of time-division multiplexing is advantageous. The transmitter should then switch from one wavelength to the other fast enough such that consecutive signals are sent to different receiving nodes. Packet switching can be also accommodated where the wavelength the signal is carried by, is in fact an explicit routing "tag" across the network. The transmitter has to tune to a new wavelength at the beginning of the packet in order to provide a direct end-to-end connection for the packet across the network. This way, the switchless network can provide a transparent versatile platform for higher network layers and facilitate the end-to-end transmission of, for example, internet protocol (IP) packets or asynchronous transfer mode (ATM) cells.

Nodes and Routers

As discussed above, the nodes according to the present invention include passive routers to route incoming wavelength on a given input port to a certain output port in accordance to a routing plan, and fixed wavelength dependent rules. Each router can have its function specified for groups of frequency channels. For a given group of channels it should combine signals carried within the group from all input ports, and direct all the signals to one of the output ports.

As further discussed below, nodes within the network can merely include one or a combination of routers. These nodes can be considered passive nodes. On the other hand, other nodes may include other active components such as transmitters and receivers. These nodes can be considered active nodes. The active nodes and passive nodes (i.e. routers) are interconnected via one or more fiber links. Switching in the network is not achieved by reconfiguration of the routers, but instead performed by the active nodes, via changes of the optical frequencies of the transmitters or in the optical frequencies selected by the receivers. Since switching may be performed at the active nodes, the passive nodes, i.e., the routers, can be simple robust elements that may in principle be placed without power supplies anywhere in the network, far from any active node.

To perform their routing function, the routers can include reflection filters 22 combined with circulators 24. The filters 22 can be conventional filters, such as for example thin film interference filters, fibre Bragg grating filters available for example from Innovative Fibers, Gatineau, Canada, or other grating filters. In one embodiment, single-channel Fiber Bragg Grating (FBG) filters for different channels are spliced together to make routers that cover more than one frequency channel. Filters for 50 GHz channel spacing are commercially available and can be incorporated into the present invention.

The filters 22 and circulators 24 configured in accordance with the present invention provide passive routers that can be implemented in an all-optical network with great flexibility. For example, when used as shown in FIG. 6, different inputs can be combined and routed to different outputs. When used as shown in FIG. 10, the same wavelength from two different inputs may be directed to the same output. As would be recognized by a person of ordinary skill in the art, the routers of the present invention are different from the routers disclosed in Chen et al, "Fiber Bragg Grating-Based Large nonblocking Multiwavelength Cross-Connects" discussed above. In Chen et al, the routers are hard-wired cross-connects, i.e., each wavelength from each input is directed to a predetermined output and signals with the same optical wavelength originating from different inputs may not be directed to the same output. On the other hand, the routers of the present invention permit an increased flexibility in routing so as to provide a set of routing possibilities that can be fully utilized by means of the network management system. In the present invention, two inputs may direct a certain wavelength to the same output, whereupon the management system only allows one of the two inputs to make use of this wavelength. This is a new functionality that is distinct from the cross-connect functionality that has been assumed in networks thus far, be it in a re-configurable or a non-re-configurable form. The Chen et al wavelength routers are not capable of functioning in the same manner as the routers of the present invention since the Chen et al. routers are hard-wired cross-connects, as mentioned above. Note also that were the cross-connects of Chen et al to be applied to a network, one would have to devise a routing algorithm for the network since the combinations of over a 100 wavelength through a cascade of cross-connects in a mesh network are a very large number. Chen et al do not address the routing problem but provide a method to build a hard-wired cross-connect, addressing thus primarily the technological aspects of a component of known functionality (cross-connection).

Fibre Bragg grating filters combined with optical circulators were also described in U.S. Pat. No. 5,748,350 to Pan et al ("the '350 patent"), the entire content of which is hereby incorporated by reference. The '350 patent describes a method to realise an optical add-function, an optical drop function, and an optical add-drop multiplexer. Although some of the components of Pan et al are similar to components used by embodiments of the present invention, the two inventions are completely distinct. Pan et al do not address a method for the realisation of wavelength router based on a certain algorithm nor do they disclose a way to realise a network. A combination of an add-multiplexer and a drop-multiplexer as by Pan et al with an additional filter, leads to a limited edition of the hard-wired wavelength cross-connect by Chen et al. However, such combination does not lead to the present invention for the reasons explained in the previous pragraph.

Figure 11A:
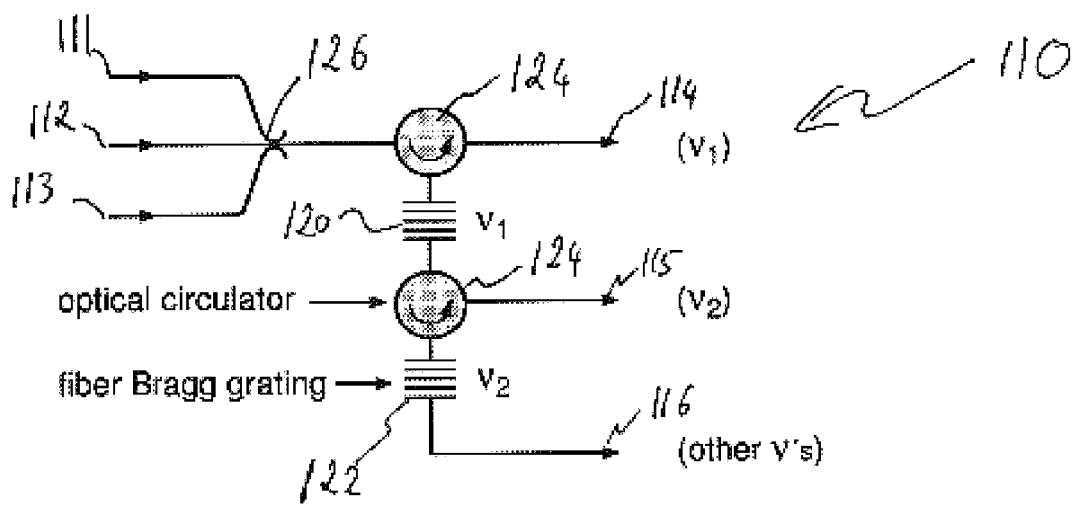
FIGS. 11A–B illustrate routers according to the present invention.
Figure 11B:
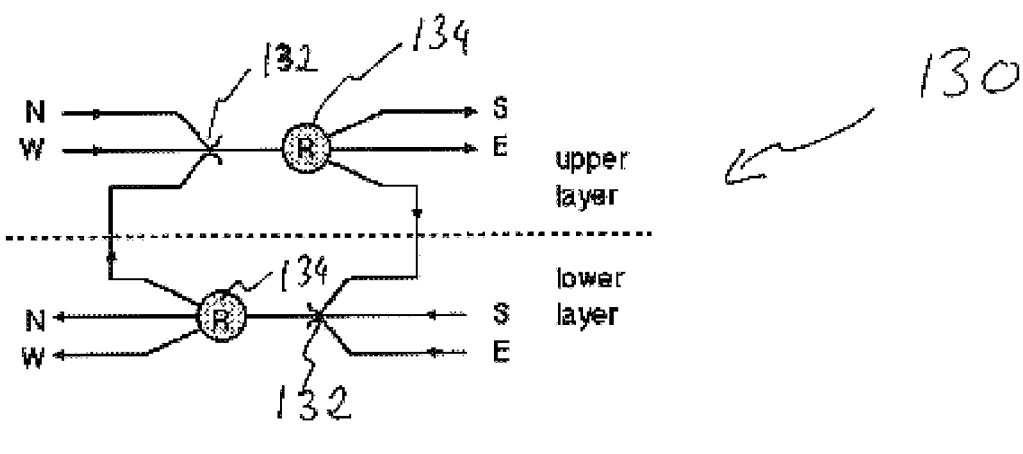

An example of a simple 3-by-3 router 110 according to the present invention is shown in FIG. 11A. The router takes one third of the optical power at each of the three inputs 111, 112, and 113, sends one frequency channel to output 114, another to output 115, and the remaining ones to output 116. The router 110 includes commercially available components like a fused fibre coupler 126, optical circulators 124, and fibre Bragg gratings 120, 122. An example of a simple 4-by-4 router 130 according to the present invention is shown in FIG. 11B. Router 130 includes a pair of directional couplers 132 with three inputs, and a pair fo 1-by-3 wavelength routers 134.

According to the present invention, the nodes may also include additional hardware depending on the function of the node within the network. For example, a transmitting node can include one or a plurality of widely tunable laser modules, as described above, associated with modulators and synchronous transport modules (STM). Nodes may also include couplers, combiners, programmable tunable passband filters, optical amplifiers, pre-amplifier, dispersion compensated fibers and other conventional hardware. Programmable wavelength converters, which can include a widely tunable laser in a transponder configuration, may also be included in one or several nodes of the network.

Figure 12:
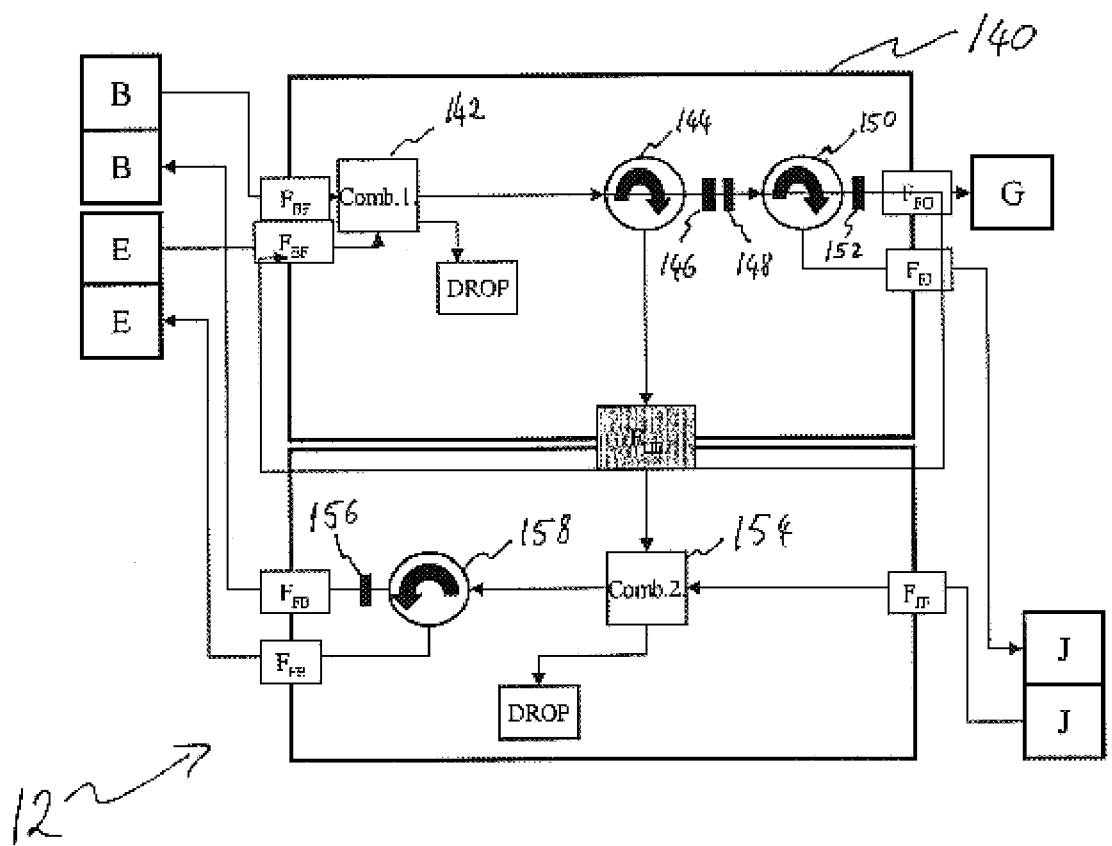
FIG. 12 shows a more detailed example of a router at a node according to the present invention.

An example of a node 12 according to the present invention is in FIG. 12 for purposes of illustration. FIG. 12 shows a router 140 of a limited functionality based on the principle shown in FIGS. 5 and 6. The router 140 is placed at node F and routes signals towards/from its neighbouring nodes B, E, G, J in FIG. 1. Input signals entering node F from node B and node E are combined in Combiner 142 and then enter circulator 144. Circulator 144 sends these combined signals first through reflection filters 146 and 148 such that the wavelength channels that belong to the two bands of filters 146, 148 are reflected and are then directed by the circulator 144 to the next output, i.e. towards $F_{UL}$. The rest of the wavelength channels are transmitted through the filters 146 and 148 and enter circulator 150. They are then directed to filter 152 such that these channels that belong to the wavelength band of filter 152 are reflected to the next output of the circulator 150 and reach node J, whereas the rest of the channels reach node G. The channels that reach point $F_{UL}$ are combined in combiner 154 with inputs from node J and arrive at circulator 158. Similarly to above, the signals that belong to the band of filter 156 are reflected by filter 156 and via the next output of the circulator 158 reach node E, whereas the rest of the channels are directed to node B. Channels that are destined for node F (the depicted node), are dropped after the combiner locations: after combiner 142 for signals entering from nodes B or E, and combiner 154 for signals entering node F from node J. In this example, no signal enters node F from node G. However, the invention is not restricted to this embodiment. Similarly, an add function is not shown in FIG. 12, but could be added either at the inputs to or at the outputs of node F as explained earlier in the text.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical network comprising:
 a plurality of transmitters configured to transmit optical signals;
 a plurality of receivers configured to receive said optical signals;
 a plurality of nodes connected by optical fibers and comprising passive wavelength routers comprising passive optical components, said passive wavelength routers being configured to:
   impose network-wide routing restrictions restricting routing of said optical signals at said nodes to a selection of possible flow-directions within said optical network, said flow-directions being defined by dividing logically a physical fiber infrastructure of said network in at least two layers, wherein at least one selected flow-direction in one layer is distinct from all selected flow-directions in another layer, and impose wavelength dependent rules for said optical signals; and a control system configured to control said optical transmitters thereby controlling end-to-end paths of said optical signals through said optical network.

2. The optical network of claim 1, wherein said at least two layers are interconnected at least at one of said nodes.

3. The optical network of claim 1, wherein said control system is configured to control said receivers.

4. The optical network of claim 1, wherein at least one of said passive wavelength routers is configured to route at least one wavelength band that includes a plurality of consecutive wavelength channels.

5. The optical network of claim 1, wherein said nodes are interconnected to form a mesh network.

6. The optical network of claim 5, wherein said mesh network is a regular grid network.

7. The optical network of claim 1, wherein at least one of the transmitters comprises a fixed wavelength laser.

8. The optical network of claim 1, wherein at least one of said transmitters comprises an array of lasers.

9. The optical network of claim 1, wherein at least one of the transmitters comprises a tunable laser.

10. The optical network of claim 1, wherein at least one of said receivers comprises a fixed-wavelength receiver.

11. The optical network of claim 1, wherein at least one of said receivers comprises a tunable wavelength receiver.

12. The optical network of claim 1, wherein at least one of said passive wavelength routers comprises at least one combiner configured to combine a plurality of optical signals that enter from a plurality of input ports before said optical signals are routed to outputs of said passive wavelengths routers.

13. The optical network in claim 1, wherein at least one of said passive wavelength routers comprises a plurality of input ports and a plurality of output ports, and optical signals from each of the input ports are passively routed to different output directions according to a set of predetermined wavelength dependent rules, and wherein at least one combiner combines at least two of said output directions to a single output port.

14. The optical network of claim 1, further comprising a number of switching elements configured to reconfigure at least one of said flow-direction rules.

15. The optical network in claim 1, further comprising a number of switching elements configured to reconfigure at least one of said wavelength dependent rules.

16. The optical network of claim 1, further comprising a number of wavelength conversion elements configured to reconfigure at least one of said flow-direction rules.

17. The optical network of claim 1, further comprising a number of wavelength conversion elements configured to reconfigure at least one of said wavelength dependent rules.

18. The optical network of claim 1, wherein said passive wavelength routers are configured to receive at least one first optical signal at a first input port, receive at least one second optical signal at a second input port, and route said first and second optical signals to a single output port in accordance with said wavelength dependent rules and said flow-direction dependent rules.

19. The optical network of claim 18, wherein optical signals that enter said at least one of said passive wavelength routers from different input ports, have a same wavelength, and wherein said control system controls which input port uses said wavelength.

20. The optical network of claim 1, wherein at least one of said passive routers comprises at least one broadband wavelength filter configured to filter a plurality of consecutive wavelength channels.

21. The optical network of claim 1, wherein said transmitters transmit Internet protocol packets.

22. The optical network of claim 1, wherein said transmitters transmit Asynchronous Transfer Mode cells.

23. The optical network of claim 1, wherein transmission in said optical fibers is unidirectional.

24. The optical network of claim 1, wherein transmission in said optical fibers is bi-directional.

25. The optical network of claim 1, wherein:
at least a number of said nodes are connected to form a plurality of sub-networks; and
said network further comprises a top network configured to interconnect said sub-networks.

26. The optical network of claim 25, wherein the top network is connected to the sub-networks at a number of nodes, a number of said nodes comprising re-configurable optical cross-connects.

27. A method for routing optical signals through an optical network comprising a plurality of nodes with passive wavelength routers, said method comprising the steps of:
transmitting a plurality of optical signals from at least a number of said nodes;
receiving a plurality of optical signals at least at a number of said nodes;
imposing network-wide routing restrictions restricting routing of said optical signals at said nodes to a selection of possible flow-directions within said optical network, said flow-directions being defined by dividing logically a physical fiber infrastructure of said network in at least two layers, wherein at least one selected flow-direction in one layer is distinct from all selected flow-directions in another layer; and
imposing wavelength dependent rules for said optical signals;
wherein end-to-end paths of said optical signals through said optical network are determined by said transmitting step.

28. The method of claim 27, wherein said flow-directions are further defined by interconnecting said at least two layers at least at one of said nodes.

29. The method of claim 27, wherein said end-to-end paths of said optical signals through said optical network are determined by said receiving step.

30. The method of claim 27, further comprising routing at least one wavelength band with said passive routers, wherein said wavelength band includes a plurality of consecutive wavelength channels.

31. The method of claim 27, wherein the transmitting step is performed using at least one fixed wavelength laser.

32. The method of claim 27, wherein the transmitting step is performed using at least one array of lasers.

33. The method of claim 27, wherein the transmitting step is performed using at least one tunable laser.

34. The method of claim 33, wherein the transmitting step is performed by tuning said widely tunable laser.

35. The method of claim 27, wherein said receiving step is performed using fixed wavelength receivers.

36. The method of claim 27, wherein said receiving step is performed using tunable wavelength receivers.

37. The method of claim 27, further comprising the step of reconfiguring said wavelength dependent rules.

38. The method of claim 27, further comprising the step of reconfiguring said flow-direction rules.

39. The method of claim 27, further comprising the steps of:

inputting a plurality of optical signals in a plurality of input ports of said passive wavelength routers; and directing the optical signals from at least two of said input ports to a same output port of said passive wavelength routers using at least one passive wavelength filter, wherein said directing of said optical signals is performed in accordance with said wavelength dependent rules and said flow-direction dependent rules.

40. The method of claim 39, wherein at least two of said optical signals that enter said passive wavelength routers from different input ports have a same wavelength, and wherein the method further comprises a step of controlling with a control system which of said at least two optical signals is transmitted in the network.

41. The method of claim 39, wherein the directing step comprises reflecting a wavelength band with said passive wavelength filter, wherein said reflected wavelength band includes a plurality of consecutive wavelengths channels.

42. An optical router for routing optical signals in an optical network, comprising:

at least one passive wavelength filter configured to:
impose network-wide routing restrictions restricting routing of said optical signals to a selection of possible flow-directions within said optical network, said flow-directions being defined by dividing logically a physical fiber infrastructure of said optical network in at least two layers, wherein at least one selected flow-direction in one layer is distinct from all selected flow-directions in another layer, and
impose wavelength dependent rules for said optical signals.

43. The optical router of claim 42, wherein said at least two layers are interconnected at least at one of said nodes.

44. The optical router of claim 42, wherein said at least one passive wavelength filter is configured to reflect a wavelength band that includes a plurality of consecutive wavelength channels.

45. The optical router of claim 44, wherein said at least two optical signals have a same wavelength.

46. The optical router of claim 42, further comprising a combiner configured to combine a plurality of optical signals from a plurality of input ports before said passive wavelength filter routes said optical signals.

47. The optical router of claim 42, further comprising:
a plurality of input ports configured to receive a plurality of optical signals, and
wherein said at least one passive wavelength filter is configured to route at least two of said optical signals that enter different input ports to a single output port in accordance with said wavelength dependent rules and said flow-direction dependent rules.

48. The optical router of claim 42, wherein said at least one passive wavelength filter comprises a broadband wavelength filter that filters a plurality of consecutive wavelength channels.

49. The optical router of claim 42, wherein said at least one passive wavelength filter comprises a broadband thin film filter.

50. The optical router of claim 42, wherein said at least one passive wavelength filter comprises a broadband Bragg filter.

51. An optical network comprising:
network elements at nodes of said optical network, said network elements being configured to route at least one wavelength band that includes a plurality of consecutive wavelength channels; and
at least one wavelength router configured to:
impose network-wide routing restrictions restricting routing of optical signals to a selection of possible flow-directions within said optical network, said flow-directions being defined by dividing logically a physical fiber infrastructure of said optical network in at least two, wherein at least one selected flow-direction in one layer is distinct from all selected flow-directions in another layer, and
impose wavelength dependent rules for said optical signals.

52. The optical network of claim 51, wherein said at least two layers are interconnected at least at one of said nodes.

53. A method for routing optical signals through an optical network comprising a plurality of nodes with wavelength routers, said method comprising the steps of:

transmitting a plurality of optical signals from at least a number of said nodes;

receiving a plurality of optical signals at least at a number of said nodes;

imposing network-wide routing restrictions restricting routing of said optical signals at said nodes to a selection of possible flow-directions within said optical network, said flow-directions being defined by dividing logically a physical fiber infrastructure of said network in at least two layers, wherein at least one selected flow-direction in one layer is distinct from all selected flow-directions in another layer, and imposing wavelength dependent rules for said optical signals;

wherein end-to-end paths of said optical signals through said optical network are determined by said wavelength routers.

54. The method of claim 53, wherein said flow-directions are further defined by interconnecting said at least two layers at least at one of said nodes.

55. The method of claim 53, wherein said end-to-end paths of said optical signals through said optical network are determined by said receiving step.

56. The method of claim 53, wherein said end-to-end paths of said optical signals through said optical network are determined by said transmitting step.

57. The method of claim 53, wherein at least one of said wavelength routers is configured to route at least one wavelength band that includes a plurality of consecutive wavelength channels.

58. The method of claim 53, further comprising the step of reconfiguring said wavelength dependent rules.

59. The method of claim 53, further comprising the step of reconfiguring said flow-direction rules.

60. The method of claim 53, wherein at least one of said wavelength routers comprises at least one combiner configured to combine a plurality of optical signals that enter from a plurality of input ports before said optical signals are routed to outputs of said wavelengths routers.

61. The method of claim 53, further comprising the steps of:
inputting a plurality of optical signals in a plurality of ports of said wavelength routers; and
directing the optical signals from at least two of said input ports to a same output port of said wavelength routers, wherein said directing of said optical signals is performed in accordance with said wavelength dependent rules.

62. The method of claim 53, further comprising a number of wavelength conversion elements configured to reconfigure at least one of said flow-direction rules.

63. The method of claim 53, further comprising a number of wavelength conversion elements configured to reconfigure at least one of said wavelength dependent rules.

64. The method of claim 53, wherein said wavelength routers are configured to receive at least one first optical signal at a first input port, receive at least one second optical signal at a second input port, and route said first and second optical signals to a single output port in accordance with said wavelength dependent rules and said flow-direction dependent rules.

65. The method of claim 64, wherein optical signals that enter said at least one of said wavelength routers from different input ports, have a same wavelength, and wherein the method further comprises a step of controlling with a control system which of said at least two optical signals is transmitted in the network.

66. The method of claim 53, wherein at least one of said wavelength routers comprises at least one broadband wavelength filter configured to filter a plurality of consecutive wavelength channels.

67. The method of claim 53, wherein said transmitters transmit Internet protocol packets.

68. The method of claim 53, wherein said transmitters transmit Asynchronous Transfer Mode cells.

69. The method of claim 53, wherein:

at least a number of said nodes are connected to form a plurality of subnetworks; and said network further comprises a top network configured to interconnect said sub-networks.

70. The method of claim 69, wherein the top network is connected to the subnetworks at a number of nodes, a number of said nodes comprising reconfigurable optical cross-connects.

* * * * *